US012669860B2

(12) United States Patent (10) Patent No.: US 12,669,860 B2
Suryanarayana et al. (45) Date of Patent: Jun. 30, 2026

(54) EXCEPTION CONTEXT AWARE HYBRID COMPUTE ZONE PREVENTING PREMATURE SYSTEM SHUTDOWN

(71) Applicant: Dell Products L.P., Round Rock, TX (US)

(72) Inventors: Shekar Babu Suryanarayana, Bangalore (IN); Karunakar Poosapalli, Telangana (IN); Alankritha T V, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 18/786,440

(22) Filed: Jul. 27, 2024

(65) Prior Publication Data

US 2026/0029836 A1 Jan. 29, 2026

(51) Int. Cl.
 *G06F 1/32* (2019.01)
 *G06F 1/3296* (2019.01)
(52) U.S. Cl.
 CPC ................................. *G06F 1/3296* (2013.01)
(58) Field of Classification Search
 CPC ................. G06F 1/32; G06F 9/44; G06F 1/12
 See application file for complete search history.

(56) References Cited

U.S. PATENT DOCUMENTS

| 2012/0233451 A1* | 9/2012 | Liu ........................ G06F 1/3203 |
| | | 713/2 |
| 2014/0344602 A1* | 11/2014 | Son ........................ G06F 8/4432 |
| | | 713/323 |
| 2017/0269943 A1* | 9/2017 | Kumar .................. G06F 1/3209 |

* cited by examiner

*Primary Examiner* — Keshab R Pandey
(74) *Attorney, Agent, or Firm* — Terrile, Cannatti & Chambers, LLP; Stephen A. Terrile

(57) ABSTRACT

A firmware management operation. The firmware management operation includes providing an information handling system with a distributed BIOS; identifying a processor environment installed on an information handling system from a plurality of processor environments, the processor environment comprising processor corresponding to a processor architecture; and, performing a hybrid compute zone operation via the distributed BIOS, the hybrid compute zone operation causing a processor of the processor environment to enter into a low power hybrid compute mode of operation, the low power hybrid compute mode of operation controlling a graceful shutdown of the information handling system.

17 Claims, 10 Drawing Sheets

EXCEPTION CONTEXT AWARE HYBRID COMPUTE ZONE PREVENTING PREMATURE SYSTEM SHUTDOWN

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: providing an information handling system with a distributed BIOS; identifying a processor environment installed on an information handling system from a plurality of processor environments, the processor environment comprising processor corresponding to a processor architecture; and, performing a hybrid compute zone operation via the distributed BIOS, the hybrid compute zone operation causing a processor of the processor environment to enter into a low power hybrid compute mode of operation, the low power hybrid compute mode of operation controlling a graceful shutdown of the information handling system.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an information handling system with a distributed BIOS; identifying a processor environment installed on an information handling system from a plurality of processor environments, the processor environment comprising processor corresponding to a processor architecture; and, performing a hybrid compute zone operation via the distributed BIOS, the hybrid compute zone operation causing a processor of the processor environment to enter into a low power hybrid compute mode of operation, the low power hybrid compute mode of operation controlling a graceful shutdown of the information handling system.

In another embodiment the invention relates to a computer-readable storage medium embodying computer program code, the computer program code comprising computer executable instructions configured for: providing an information handling system with a distributed BIOS; identifying a processor environment installed on an information handling system from a plurality of processor environments, the processor environment comprising processor corresponding to a processor architecture; and, performing a hybrid compute zone operation via the distributed BIOS, the hybrid compute zone operation causing a processor of the processor environment to enter into a low power hybrid compute mode of operation, the low power hybrid compute mode of operation controlling a graceful shutdown of the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
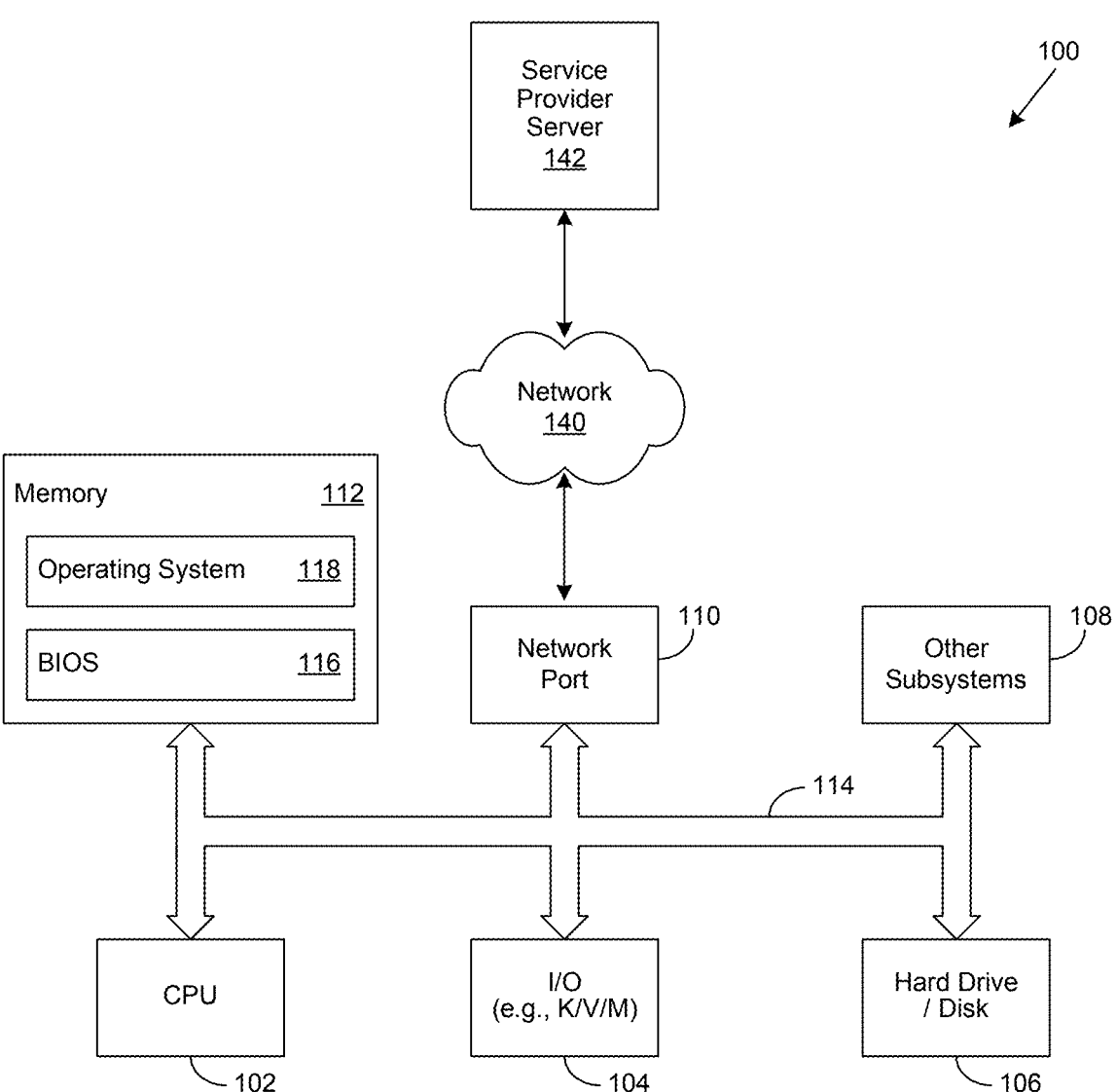
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention reflect an appreciation that sudden system crashes or pre-mature system shutdowns can result in performance issues as well as negative user experiences. Various aspects of the invention reflect an appreciation that system context preservation, data restoration, or a combination thereof, are important for a user, especially when working or presenting system content.

Various aspects of the invention reflect an appreciation that software faults like fatal system errors (which can result in a blue screen of death), page faults, memory overflows, etc., can force system into pre-mature shutdown. Various aspects of the present disclosure include an appreciation that pre-mature system shutdown can cause many applications loose data and user context. Various aspects of the invention reflect an appreciation that improper power breakdowns or critical battery states can cause issues such as system hangs, data loss, etc. Various aspects of the present disclosure include an appreciation that even if a user attaches a power adapter after such a power breakdown or critical battery state, the system often restarts and reinitializes the complete user context. Various aspects of the invention reflect an appreciation that it would be desirable to provide a seamless process for handling software faults with less power consumption.

Various aspects of the invention reflect an appreciation that random hang issues have been reported during operation system runtime operations on certain processor environment architectures when performing a diagnostics operation such as a 0×A0 bug check code. Various aspects of the invention reflect an appreciation that certain processor environment architecture devices can have a high-density delay which includes a negative power down, which often occurs during a firmware update operation. Various aspects of the invention reflect an appreciation that certain processor environment architecture firmware versions can result in mismatched flag detections when performing an advanced configuration and power interface (ACPI) check at operating system runtime which can result in a system hang. This issue has been reported with data corruption while graphics/storage/network operations are in progress.

Various aspects of the invention reflect an appreciation that it would be desirable to provide a workload context solution which ensures safe execution without data corruption by preventing premature shutdowns. Various aspects of the invention reflect an appreciation that it would be desirable to maintain user context, user data, or a combination thereof, when an unexpected system reboot occurs.

A system and method are disclosed for providing an information handling system with a hybrid compute zone. In certain embodiments, the hybrid compute zone is processor environment agnostic. In certain embodiments, the hybrid compute zone dynamically creates a lower power hybrid compute zone which enables a processor to enter into a hybrid power compute mode of operation. In certain embodiments, the hybrid compute mode of operation provides light loading conditions to meet system requirements even during system hang or fatal system crash scenarios. In certain embodiments, the hybrid compute zone includes a real time battery probe linked system exception context aware protocol which seamlessly continues processor operation in hybrid modulated power limit mode. In certain embodiments, the power performance of the processor is tuned via a processor power parameter. In certain embodiments, the processor power parameter includes a processor power performance/Platform/System power performance (PLx/PsysPLx) processor power parameter. In certain embodiments, the processor is tuned using the processor power parameter with respect to current battery power capabilities to turbo mode thus preventing pre-mature system shutdown. In certain embodiments, the hybrid compute zone operation enables safe workload execution for non-software failures. In certain embodiments, the hybrid compute zone operation performs a workload aware low power checklist-based power operation. In certain embodiments, the workload aware low power checklist-based power operation detects and remediates failures to provide safe workload execution without data corruptions. In certain embodiments, the workload aware low power checklist-based power operation is optimized for non-software errors such as hardware or battery issues).

In certain embodiments, the hybrid compute zone provides a processor environment agnostic solution which provides a processor exception handler to enter the processor into a low power hybrid compute zone. In certain embodiments, entering the processor into the low power hybrid compute zone allows the system to be power optimized before premature shutdowns. In certain embodiments, entering the processor into the low power hybrid compute zone ensures safe execution without any data corruption by preventing a premature shutdown. In certain embodiments, the hybrid compute zone includes a seamless context aware protocol which continuously probes real time battery and processor consumption. In certain embodiments, the seamless context aware protocol maintains the processor in a hybrid modulated power limit mode of operation. In certain embodiments, the hybrid modulated power limit mode of operation is platform power tuned via a processor power performance/Platform/System power performance (PLx/PsysPLx) processor power parameter.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100. In certain embodiments, the firmware management operation may be performed during operation of an IHS 100. In various embodiments, performance of the firmware management operation may result in the realization of improved operation of an IHS 100.

Figure 2:
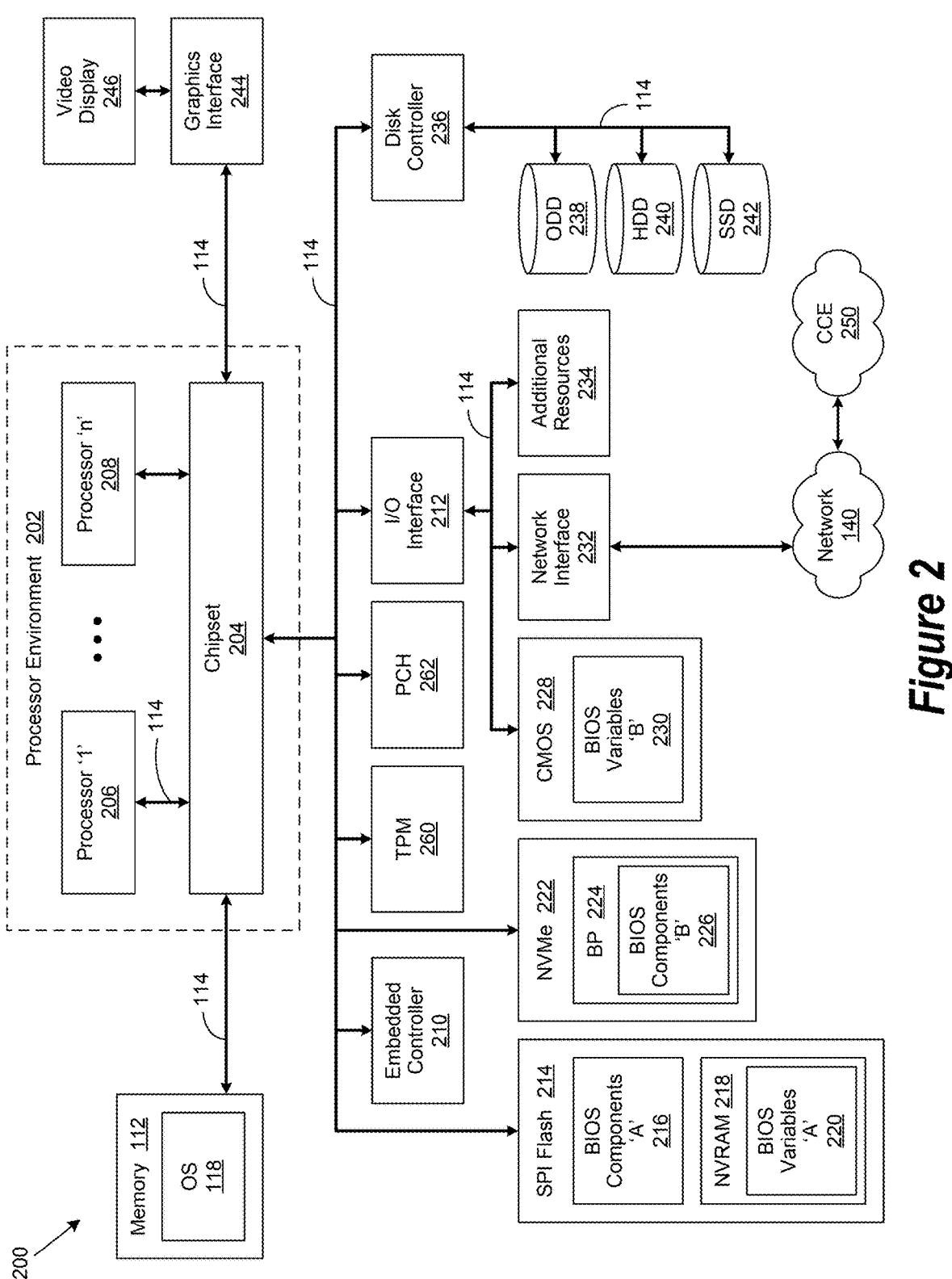
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as an information handling system, described in greater detail herein, such as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208. In various embodiments, the one or more architectures can include an x86 type processor architecture, an ARM type processor architecture, or a combination thereof. In various embodiments, a processor environment implementing an x86 type processor architecture provides an x86 type processor environment. In various embodiments, a processor environment implementing an ARM type processor architecture provides an ARM type processor environment.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, a Trusted Platform Module (TPM) 260, a Platform Controller Hub (PCH) 262, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the TPM 260, the PCH 262, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
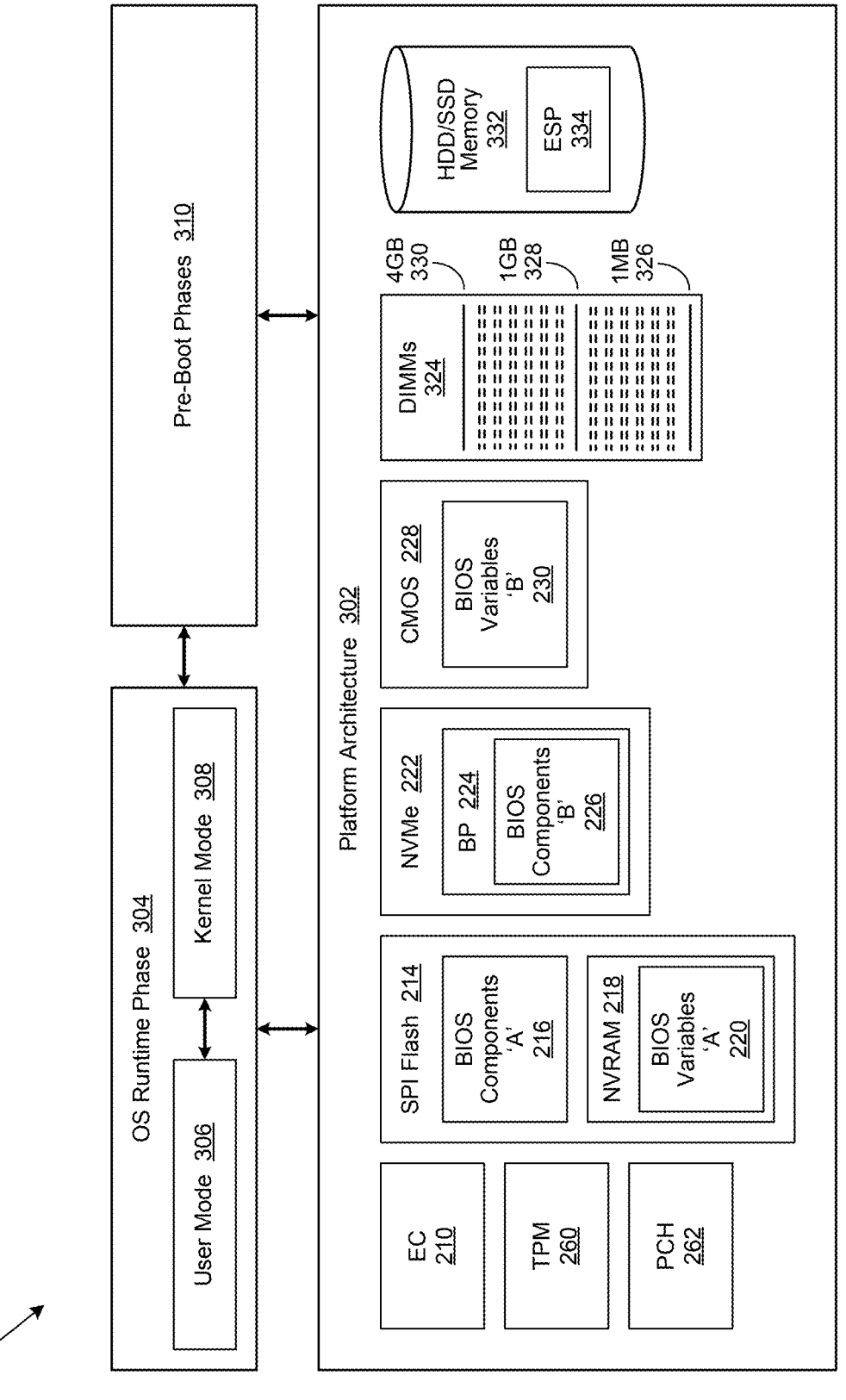
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom®, Broadcom®, Nvidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, a Trusted Platform Module (TPM) 260, a Platform Controller Hub (PCH) 262, Serial Peripheral Interface (SPI) Flash 214 memory, Nonvolatile Memory Express (NVMe) 222 memory, and a complementary metal-oxide-semiconductor (CMOS) 228 chip, or a combination thereof, each of which may be considered a component of an information handling system as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the EC 210 may be implemented, directly or indirectly, within the ASDFMP 300 to provide a root of trust function. As used herein, a root of trust broadly refers to a highly reliable component, such as an EC 210, that performs specific, important security functions. In various embodiments, a root of trust component may be implemented as a building block upon which other components of the ASDFMP 300 can derive security functions.

In various embodiments, the EC 210 may be implemented to perform a root of trust operation. As used herein, a root of trust operation broadly refers to a distributed firmware management operation, described in greater detail herein, performed directly, or indirectly, within an ASFDMP 300 to provide a root of trust by leveraging a secure interface to ensure integrity and security of communication between certain components of the ASDFMP 300. In various embodiments, one or more root of trust operations may be performed to enhance the security and trustworthiness of the ASDFMP 300.

Skilled practitioners of the art will be familiar with a TPM 260, which is an international standard for a secure crypto processor, typically implemented as a dedicated microcontroller designed to secure various hardware components of an ASDFMP 300 through the use of integrated cryptographic keys. In various embodiments, a TPM 260 may be implemented to increase the security of an ASDFMP 300 and to protect it against certain firmware attacks. In various embodiments, a TPM 260 may be implemented in combination with an EC 210 to perform a root of trust operation.

Those of skill in the art will likewise be familiar with a PCH 262, which broadly refers to a family of chipsets manufactured by Intel® to control certain data paths and support functions used in conjunction with Intel® processors. However, as used herein, a PCH 262 may broadly refer to one or more processor-agnostic functionalities of an ASDFMP 300 that may be used, directly or indirectly within it, to control various data paths and support functions associated with a particular processor. Examples of such processors include those manufactured by Intel®, AMD®, Qualcomm®, Broadcom®, Nvidia®, and so forth. Accordingly, various embodiments of the invention reflect an appreciation that provision of such PCH 262 functionalities may require a different implementation for each processor architecture.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
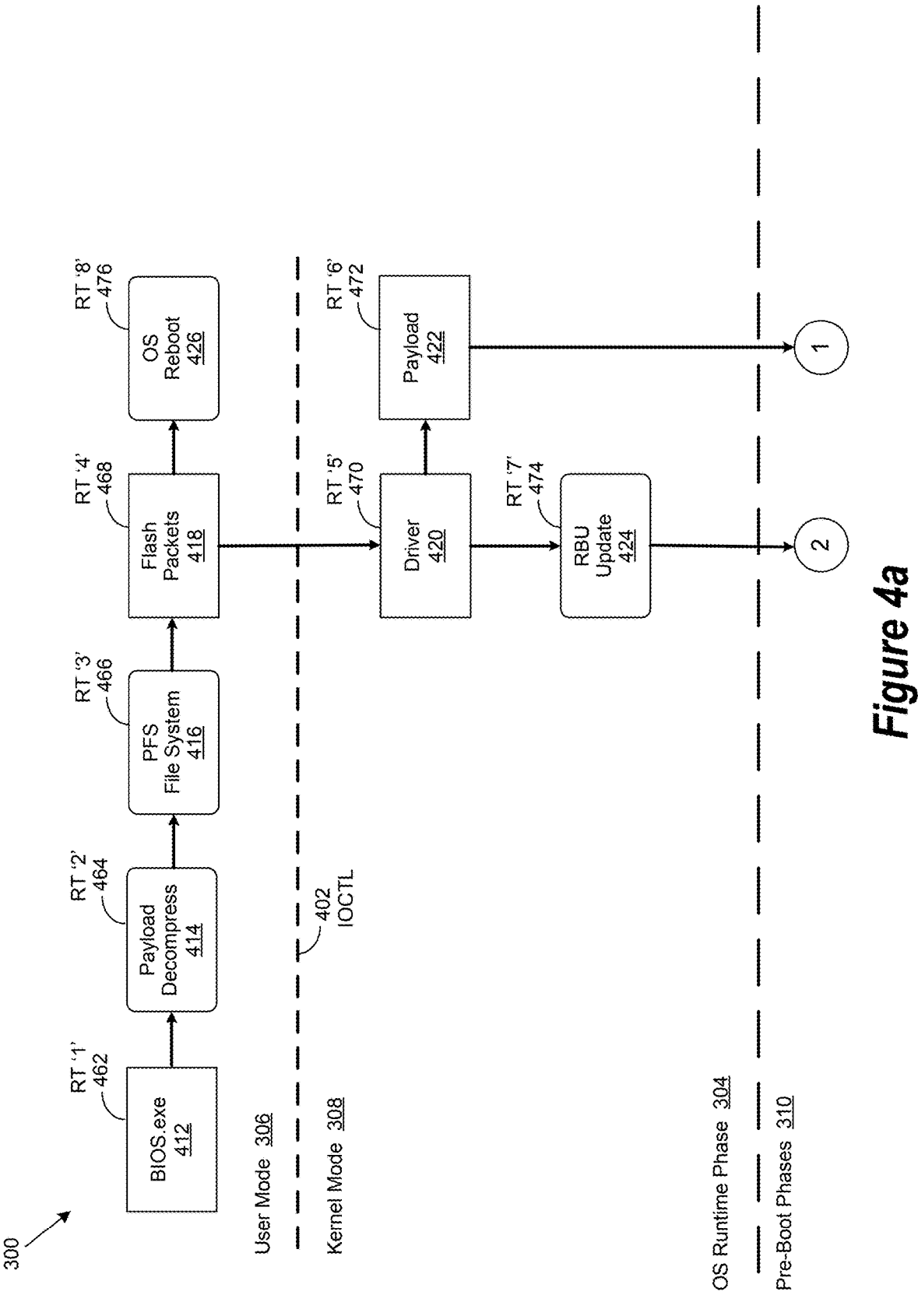
FIGS. 4a through 4c are a simplified block diagram showing the performance of certain distributed firmware management operations.
Figure 4B:
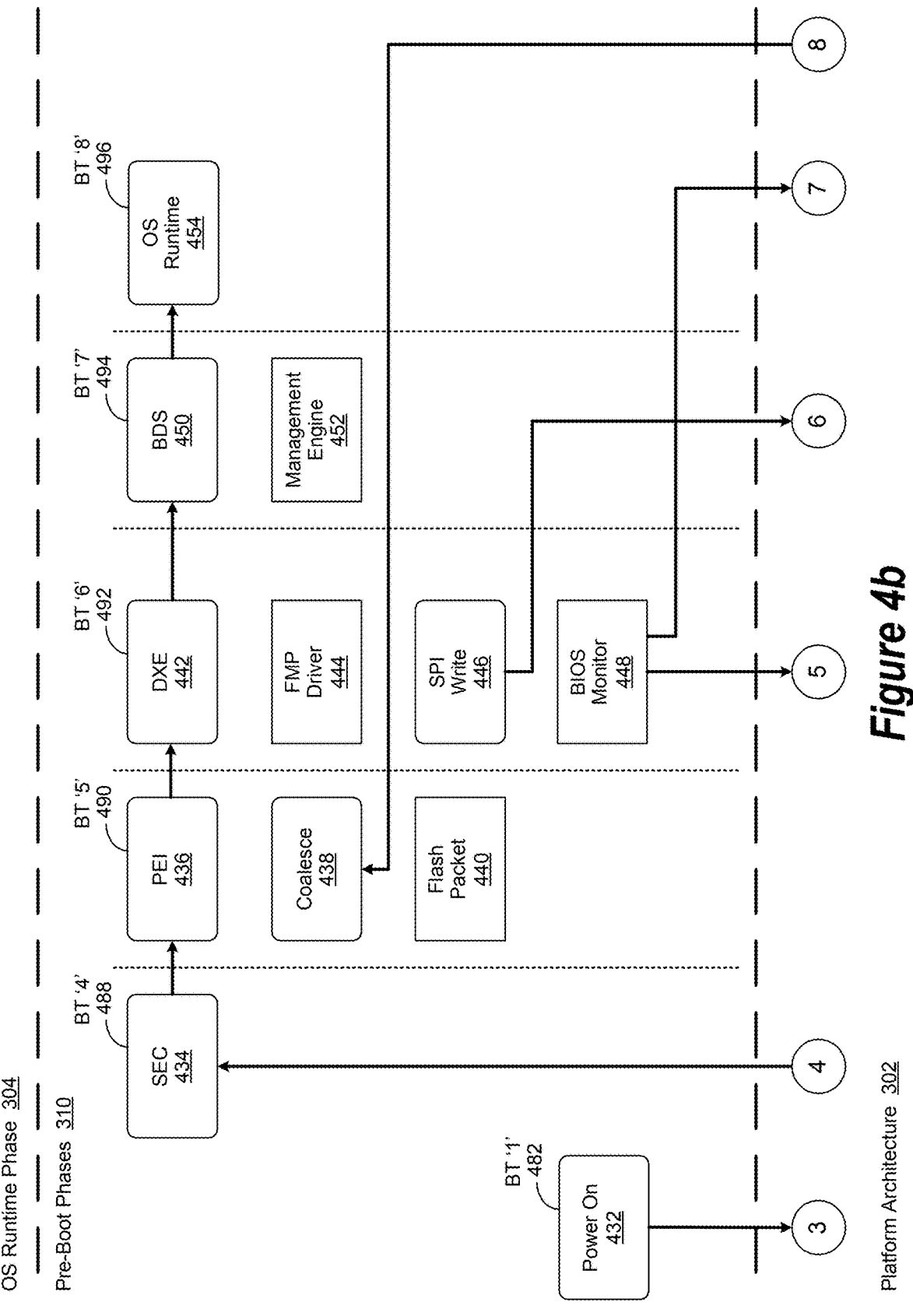
Figure 4C:
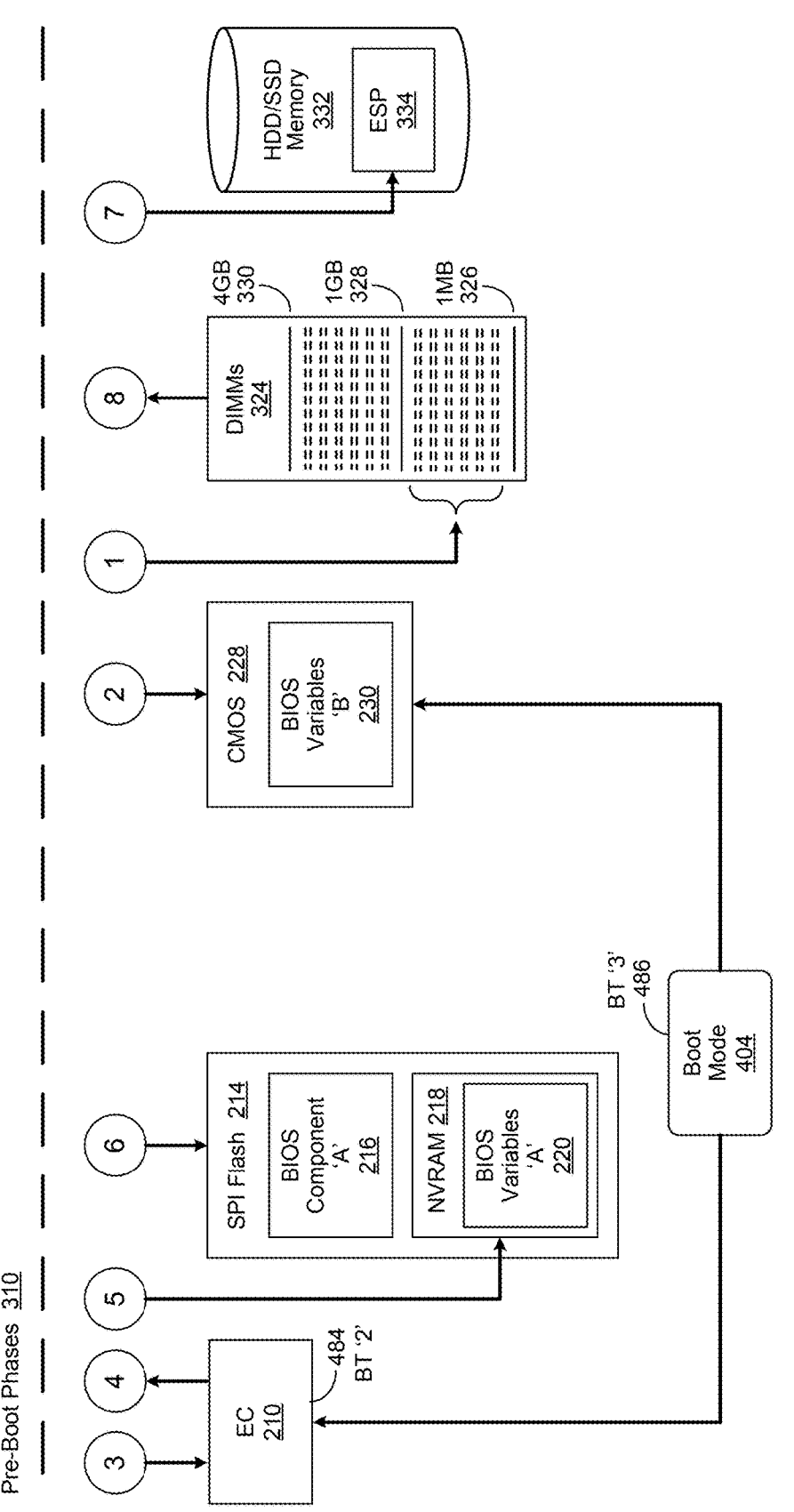

FIGS. 4a through 4c are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4a, a distributed firmware management operation may be initiated by the ASDFMP 300 receiving a BIOS.exe 412 file in runtime (RT) step '1' 462. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver execution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) drivers 444. In general, the DXE Core component is responsible for producing a set of boot services, DXE services, and RT Services. Likewise, the DXE Dispatcher component is responsible for discovering and executing FMP drivers 444 in the correct order. In turn, the FMP drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5A:
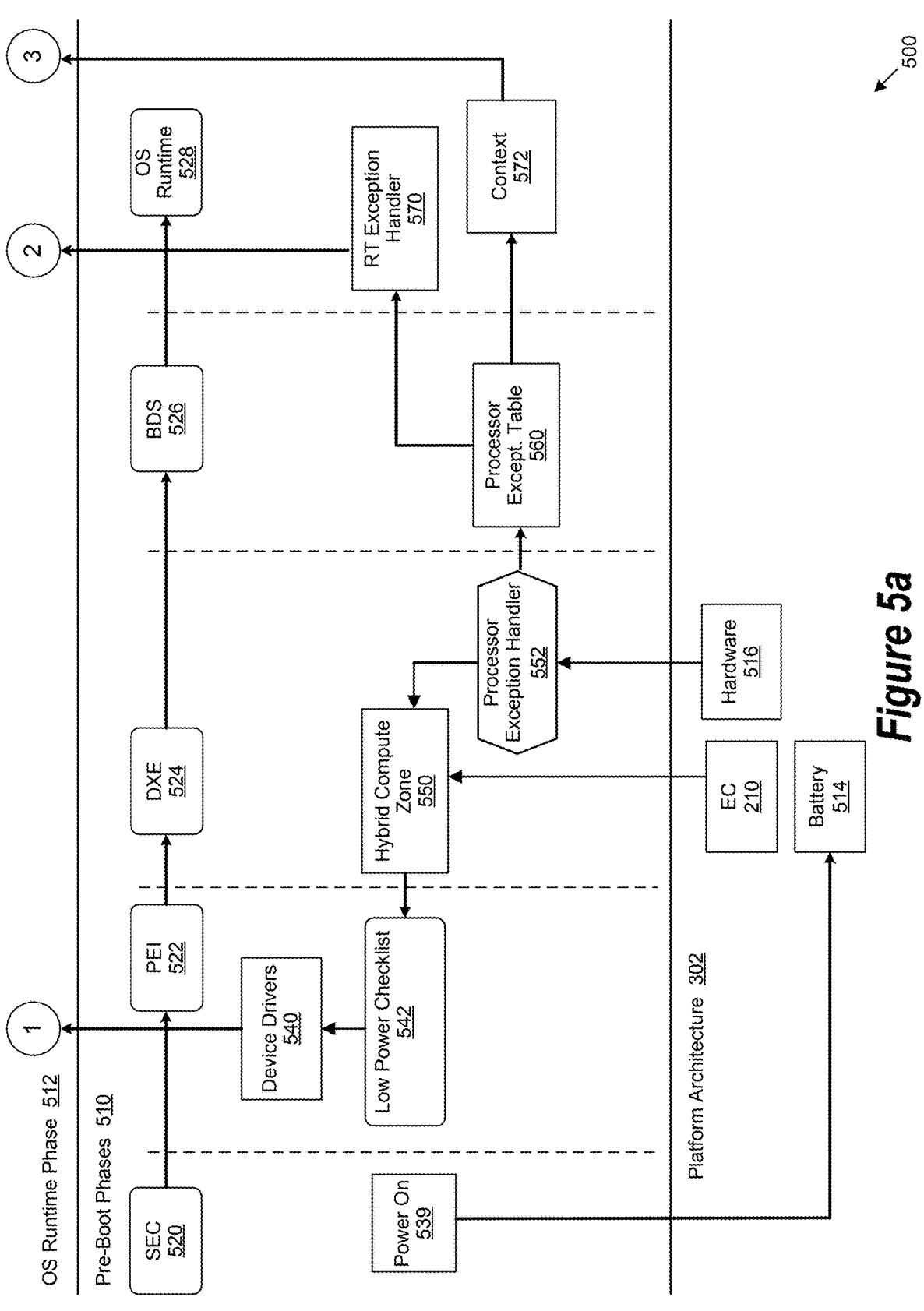
FIGS. 5a and 5b, generally refer to as FIG. 5, show a simplified block diagram showing a hybrid compute zone system.
Figure 5B:
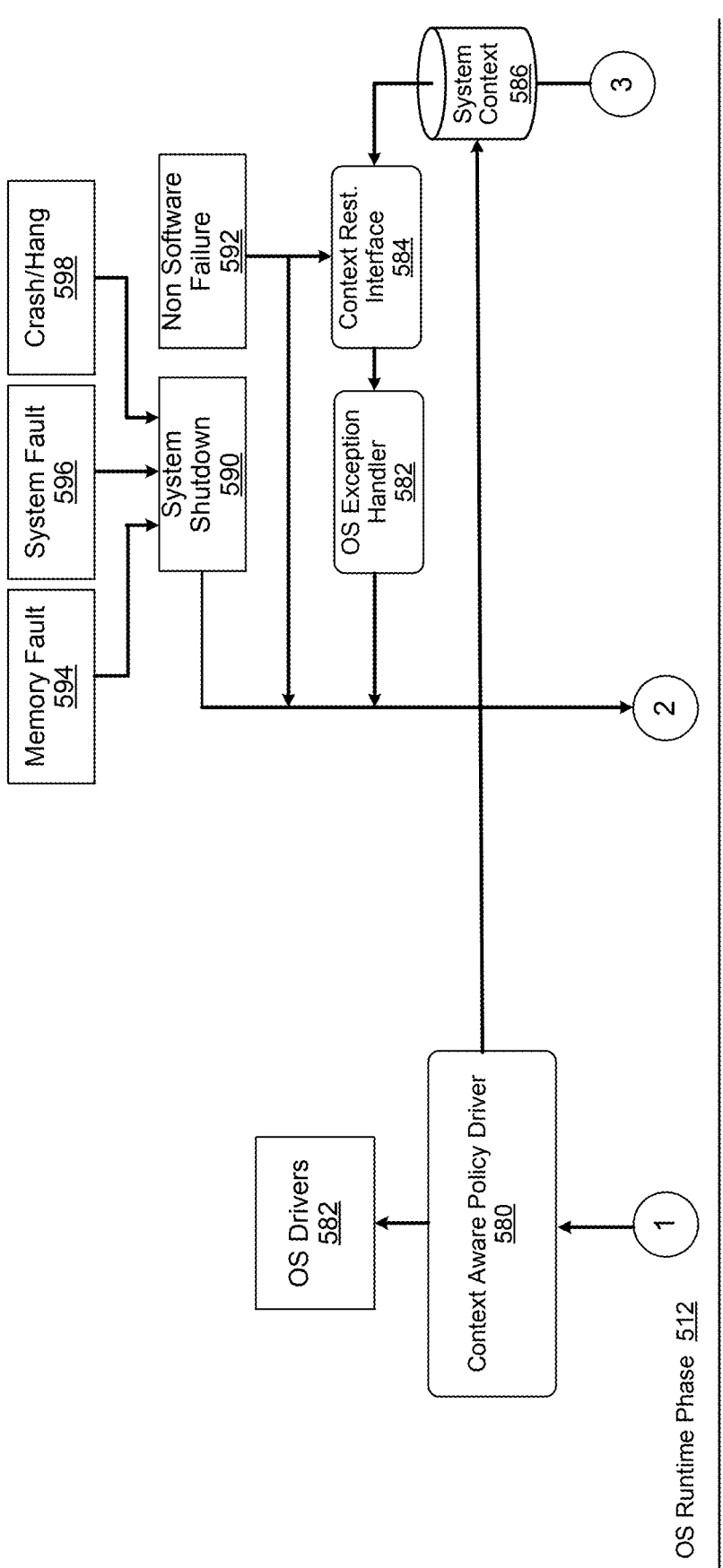

FIGS. 5*a* and 5*b*, generally referred to as FIG. 5, show a simplified block diagram showing a hybrid compute zone system 500. In certain embodiments, the hybrid compute zone system 500 is included within an information handling system such as information handling system 100. In certain embodiments, the hybrid compute zone system 500 is included within a multi-processor operating environment such as multi-processor operating environment 200. In certain embodiments, the hybrid compute zone system includes a platform architecture 302.

In certain embodiments, a hybrid compute zone operation is performed by the hybrid compute zone system 500. As used herein, a hybrid compute zone operation broadly refers to a firmware management operation, described in greater detail herein, performed, directly or indirectly, within a multi-processor operating environment 200 to store, retrieve, aggregate, disaggregate, add, delete, modify, revise, update, replace, or restore a hybrid compute zone associated with an information handling system. As used herein, a hybrid compute zone broadly refers to an operating region of an information handling system for initializing, maintaining, managing, or a combination thereof, items associated with the information handling system during a graceful shutdown of the information handling system. In various embodiments, the items associated with the information handling system during the graceful shutdown can include applications, device drivers, hardware components of the information handing system, or a combination thereof. As used herein, a graceful shutdown broadly refers to a shutdown of the system which safely closes all active application programs, saves user data, saves user context and then powers off the system. It will be appreciated that a graceful shutdown prevents data loss and ensures the system terminates all processes properly before turning off.

In certain embodiments, the context aware device information includes adaptive context aware device information. In certain embodiments, the context aware device information includes a set of data associated with a component of the information handling system (i.e., a device), a set of data associated with how the component of the information handling system is interacting with other components of the information handling system environment, or a combination thereof. In certain embodiments, the set of data may be specific to when the component is executing a particular task such as a particular workload.

As used herein, context awareness broadly refers to a capability of the ASDFMP 300 to sense and react based upon information associated with the information handling system environment. As used herein, adaptive context awareness broadly refers to a capability of the ASDFMP 300 to sense and react based upon information associated with the information handling system environment which adjusts based upon one or more conditions associated with the information handling system environment.

Referring now to FIG. 5, in certain embodiments, the hybrid compute zone system 500 includes a pre-boot portion 510, a run time portion 512, a platform architecture 302, or a combination thereof. In certain embodiments, the platform architecture 302 includes an embedded controller 210, a battery module 514 as well as one or more hardware components 516. In certain embodiments, the multi-processing environment 200 includes a battery module 514. In certain embodiments, the platform architecture 302 of the ASDFMP 300 includes a battery module 514. In certain embodiments, the one or more hardware components 516 correspond to components included within the multi-processor operating environment 200. In certain embodiments, the one or more hardware components 516 correspond to components included within the platform architecture 302 of the ASDFMP 300.

In certain embodiments, the pre-boot portion includes an SEC phase 520, a PEI phase 522, a DXE phase 524, a BDS phase 526 and a run-time phase 528. In certain embodiments, the SEC phase 520 corresponds to SEC phase 434. In certain embodiments, the DXE phase 524 corresponds to DXE phase 442. In certain embodiments, the BDS phase 526 corresponds to BDS phase 450. In certain embodiments, the run-time state 528 corresponds to operating system runtime state 454.

In certain embodiments, the SEC phase 520 includes a power on module 530. In certain embodiments, the PEI phase 522 includes one or more firmware drivers maintained within a firmware driver module 540, a device low power checklist module 542, or a combination thereof. In certain embodiments, the DXE phase 524 includes a hybrid compute zone module 550, a processor exception handler module 552, or a combination thereof. In certain embodiments, the BDS phase 526 includes a processor exception table module 560. In certain embodiments, the operating system runtime state 526 includes a runtime exception handler module 570, context module 572, or a combination thereof.

In certain embodiments, the runtime portion 512 includes a context aware policy driver module 580, an operating system drive module 582 having one or more operating system drivers, an operating system exception handler module 584, a context restoration interface module 584, a system context storage repository 586, or a combination thereof. In certain embodiments, a premature system shutdown 590, a non-software failure 592, or a combination thereof, can occur within the operating system runtime portion 512. In certain embodiments, a memory fault 594, a fatal system error 596, a system crash/hang 598, or a combination thereof, can cause a premature system shutdown 590.

In certain embodiments, a pre-boot portion of the hybrid compute zone operation is initiated when the power on module 530 communicates with the battery module 514 when the system is powered on. The battery module 514 in turns informs the embedded controller 210 that the system has been powered on. The embedded controller 210 communicates with the hybrid compute zone module 550. The hybrid compute zone module establishes a hybrid compute zone for the system. In certain embodiments, the hybrid compute zone includes a low power hybrid compute zone. Once the hybrid compute zone is established, the hybrid compute zone module 550 communicates with the device low power checklist module 542, the processor exception handler module 552, or a combination thereof. In certain embodiments, the device low power checklist module maintains a list of components to which power should be maintained during hybrid compute zone operation. In certain embodiments, the list of components to which power should be maintained during hybrid compute zone operation is determined by information provided by firmware drivers maintained within the firmware driver module. In certain embodiments, the processor exception handler module 552 generates processor exception information based upon the information provided by the hybrid compute zone module 550. In certain embodiments, the processor exception information controls placing the identified components into the low power mode of operation. In certain embodiments, this control includes maintaining the identified components within the hybrid compute zone.

In certain embodiments, the processor exception handling module 552 provides information to the processor exception table module 560 regarding which components have been placed in the hybrid compute zone. In certain embodiments, the processor exception table module 560 maintains a table of the components that have been placed in thy hybrid compute zone. In certain embodiments, the table includes additional operational information associated with one or more of the entries in the table. In certain information the additional information includes context information associated with one or more of the entries in the table. In certain embodiments, the context information enables the hybrid compute zone operation to be context aware. In certain embodiments, the context awareness can be adaptive as the context information associated with the entries in the table is updated as the context of the components changes.

In certain embodiments, the hybrid compute zone provides a processor environment agnostic solution which provides the processor exception handler module 560 to enter the processor into a low power hybrid compute zone. In certain embodiments, entering the processor into the low power hybrid compute zone allows the system to be power optimized before premature shutdowns. In certain embodiments, entering the processor into the low power hybrid compute zone ensures safe execution without any data corruption by preventing a premature shutdown.

In certain embodiments, the hybrid compute zone is processor environment agnostic. In certain embodiments, the hybrid compute zone operation dynamically creates a lower power hybrid compute zone which enables a processor to enter into a hybrid power compute mode of operation. In certain embodiments, the hybrid compute mode of operation provides light loading conditions to meet system requirements even during system hang or fatal system crash scenarios. In certain embodiments, the hybrid compute zone includes a real time battery probe linked system exception context aware protocol which seamlessly continues processor operation in hybrid modulated power limit mode of operation. In certain embodiments, the power performance of the processor is tuned via a processor power parameter. In certain embodiments, the processor power parameter includes a processor power performance/Platform/System power performance (PLx/PsysPLx) processor power parameter. In certain embodiments, the processor is tuned using the processor power parameter with respect to current battery power capabilities to turbo mode thus preventing premature system shutdown.

In certain embodiments, the hybrid compute zone includes a seamless context aware protocol which continuously probes real time battery and processor consumption. As used herein, a seamless context aware protocol broadly refers to a standardized set of rules for formatting and processing data used for seamlessly communicating between a battery, an embedded controller, a hybrid compute zone, a context module, or a combination thereof, when performing a context aware hybrid compute zone operation. In certain embodiments, the seamless context aware protocol maintains the processor in a hybrid modulated power limit mode of operation. In certain embodiments, the hybrid modulated power limit mode of operation is platform power tuned via a processor power performance/Platform/System power performance (PLx/PsysPLx) processor power parameter.

In certain embodiments, the processor exception table module 560 communicates with the runtime exception handler module 570, the context module 572, or a combination thereof. In certain embodiments, the runtime exception handler module 570 generates runtime exception information based upon the information provided by the processor exception table module 560. In certain embodiments, the runtime exception information controls placing the identified runtime components into the low power mode of operation. In certain embodiments, the context module 572 monitors context information associated with components of the system. In certain embodiments, the context module 572 saves the context information, restores a context to the system, or a combination thereof.

In certain embodiments, a runtime portion of the hybrid compute zone operation is initiated once the pro-boot portion of the hybrid compute zone operation completes. In certain embodiments, the firmware driver module 540 from the preboot portion 510 communicates with the context aware policy driver module 580. In certain embodiments, the runtime exception handling module 570 from the preboot portion 510 communicates with the operating system exception handler module 584. In certain embodiments, the context module 572 from the preboot portion 510 communicates with the system context storage repository 586. In certain embodiments, when a premature shutdown 590 (such as a memory fault 594, a fatal system error 596, a system crash/hang 598, or a combination thereof) is detected, this condition is communicated to the processor exception handling module 552 from the preboot portion 510. In certain embodiments, the premature shutdown 590 is detected by the operating system exception handler module 584 which then communicates this condition to the processor exception handler module 552. In certain embodiments, when a non-software failure 592 is detected, this condition is communicated to the processor exception handling module 552 from the preboot portion 510. In certain embodiments, the non-software failure 592 is communicated to the context restoration interface module 584, which in turn communicates this information to the operating system exception handler module 584 which then communicates this condition to the processor exception handler module 552.

In certain embodiments, the hybrid compute zone operation enables safe workload execution for non-software failures 592. In certain embodiments, the hybrid compute zone operation performs a workload aware low power checklist-based power operation. In certain embodiments, the workload aware low power checklist-based power operation detects and remediates failures to provide safe workload execution without data corruption. In certain embodiments, the workload aware low power checklist-based power operation is optimized for non-software errors (such as hardware or battery issues).

Figure 6A:
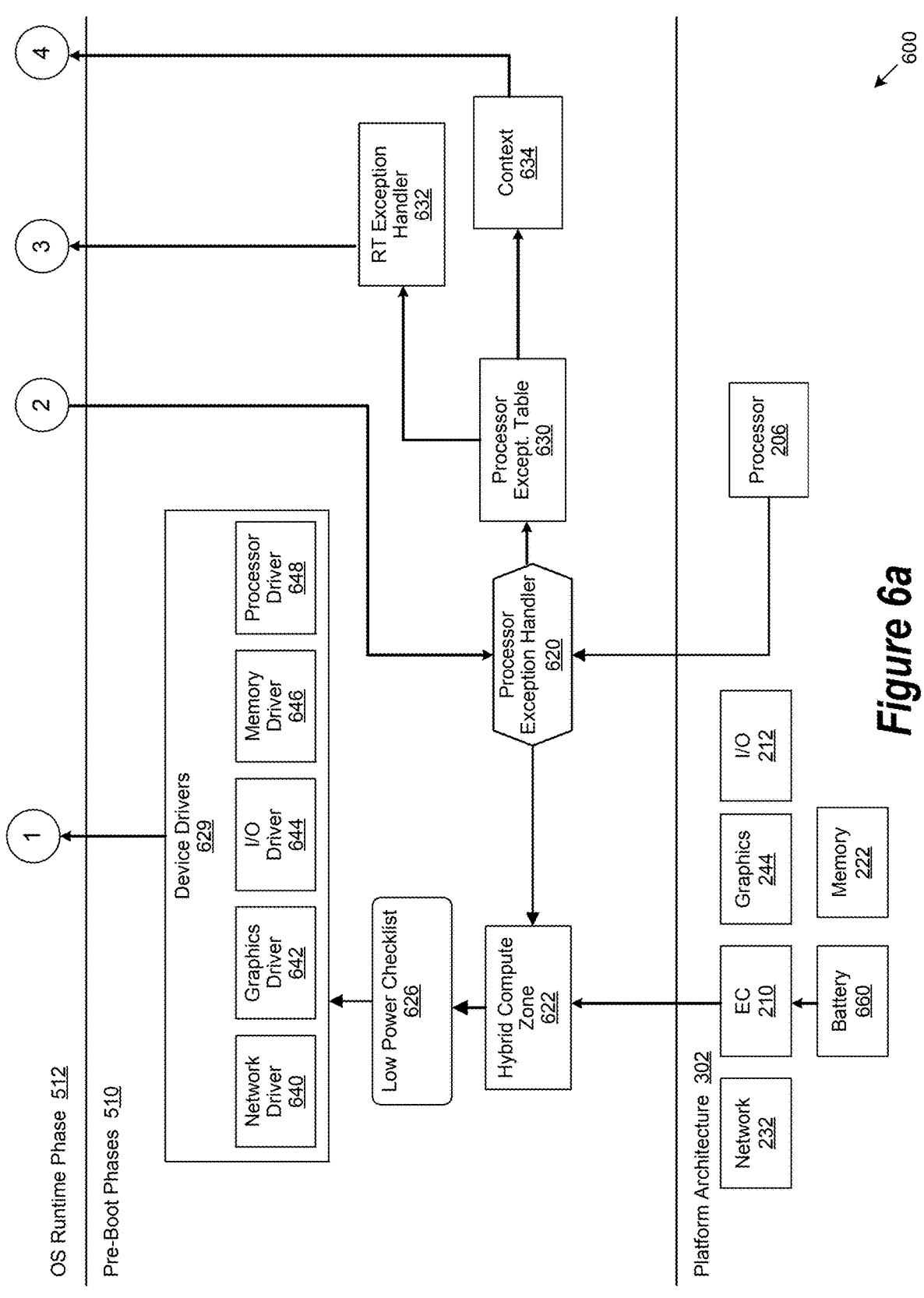
FIGS. 6a and 6b, generally referred to as FIG. 6, show a simplified block diagram showing a hybrid compute zone operation.
Figure 6B:
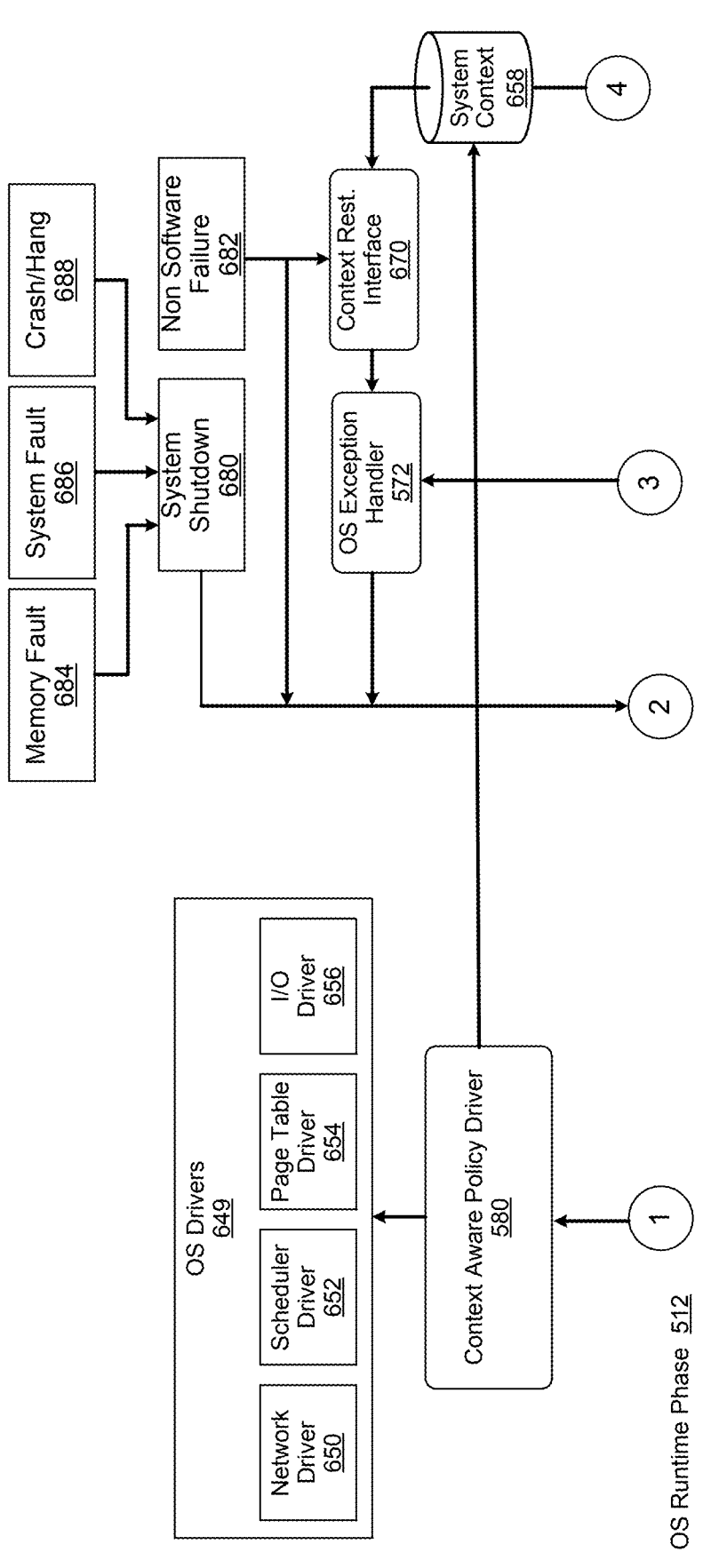

FIGS. 6a and 6b, generally referred to as FIG. 6, show a simplified block diagram of a hybrid compute zone operation 600. In certain embodiments, a hybrid compute zone system such as hybrid compute zone system 500 performs the hybrid compute zone operation 600. In certain embodiments, the hybrid compute zone operation 600 is performed within an information handling system such as information handling system 100. In certain embodiments, the hybrid compute zone operation 600 is performed within a multi-processor operating environment such as multi-processor operating environment 200. In certain embodiments, the hybrid compute zone operation 600 interacts with a platform architecture such as platform architecture 302. In certain embodiments, the hybrid compute zone operation includes a firmware hybrid compute zone operation 610, a hybrid compute zone operating system operation 612, or a combination thereof. As used herein a firmware hybrid compute zone operation 610 broadly refers to a hybrid compute zone operation with executes during a firmware portion of information handling system operation. As used herein an operating system hybrid compute zone operation 612 broadly refers to a hybrid compute zone operation with executes during an operating system portion of information handling system operation.

In certain embodiments, the hybrid compute zone operation includes a hybrid compute zone exception handling operation. As used herein, a hybrid compute zone exception handler operation broadly refers to a hybrid compute zone operation which initializes, maintains, manages, or a combination thereof, an exception handler of an information handling system. In various embodiments, the exception hander includes a processor exception handler, a runtime exception handler, an operating system exception handler, or a combination thereof.

In certain embodiments, the hybrid compute zone exception handling operation provides a processor environment agnostic solution which efficiently leverages a first processor architecture power manager and another processor architecture power optimizer. In certain embodiments, the power manager is contained within an x86 type processor architecture. In certain embodiments, the first processor architecture power manager performing an advanced power management operation, the advanced power management operation enabling an operating system executing on a processor corresponding to the first processor architecture to work with the distributed BIOS to achieve power management. In certain embodiments, the power optimizer is contained within an ARM type processor architecture. In certain embodiments, the hybrid compute zone exception handling operation uses a processor exception handler 620 to enable a low power hybrid compute mode of operation. In certain embodiments, the second processor architecture power optimizer performing power optimization operation, the power optimization operation enabling an operating system executing on a processor corresponding to the first processor architecture to work with the distributed BIOS to achieve optimized power usage of the processor.

In certain embodiments, the hybrid compute zone exception handling operation dynamically creates a hybrid compute zone 622. In certain embodiments, the processor exception handler 620 communicates with a processor exception table 630. In certain embodiments, the processor exception table 630 communicates with a runtime exception handler 632, a context module 634, or a combination thereof. In certain embodiments, the runtime exception handler 632 generates runtime exception information based upon the information provided by the processor exception table 630. In certain embodiments, the runtime exception information controls placing the identified runtime components into the low power mode of operation. In certain embodiments, the context module 628 monitors context information associated with components of the system. In certain embodiments, the context module 634 saves the context information, restores a context to the system, or a combination thereof.

In certain embodiments, the hybrid compute zone communicates within one or more firmware drivers 629, such as a network driver 630, a graphics driver 632, an I/O driver 634, such a USB driver, a memory driver 636, such as an NVMe driver, a processor driver 638, or a combination thereof. In certain embodiments, the firmware drivers 629 communicate with the operating system hybrid compute zone operation 612. In certain embodiments, the firmware drivers 629 communicate with a context aware policy driver 640 of the operating system hybrid compute zone operation 612. In certain embodiments, the context aware policy driver 640 communicates with one or more hardware drivers 649. In certain embodiments, the hardware drivers 642 include a hardware graphics driver 650, a hardware scheduler driver 652, a hardware page table driver 654, a hardware I/O driver 656, such as a hardware USB driver, or a combination thereof. In certain embodiments, the context aware policy driver 640 also communicates with a system context storage repository 658.

In certain embodiments, when executing the runtime hybrid compute zone exception handling operation 612, a context restoration interface 670 communicates with an operating system exception handler 672. In certain embodiments, a premature system shutdown 680, a non-software failure 682, or a combination thereof, can occur within the operating system runtime portion 612. In certain embodiments, a memory fault 684, a fatal system error 686, a system crash/hang 688, or a combination thereof, can cause the premature system shutdown 680.

In certain embodiments, the hybrid compute zone exception handling operation includes a lower power hybrid compute zone. In certain embodiments, the lower power hybrid compute zone enables a processor 206 to enter into a hybrid power compute mode of operation with light loading conditions. In certain embodiments, the light loading conditions allow the system to meet system requirements even during system shutdown operations such as those caused by a memory fault, a fatal system error, a system crash/hang, or a combination thereof.

In certain embodiments, the lower power hybrid compute zone 622 is created with-in the processor exception handler 620 even when the system is in a hang condition. In certain embodiments, the hybrid compute zone exception handling operation holds the processor in the low power mode of operation even as the power rails of the system shut off immediately. In certain embodiments, the hybrid compute zone exception handling operation tunes the battery 660 to turbo mode. In certain embodiments, running the battery 660 in turbo mode provides enough power to the hybrid compute zone 622 to keep hybrid compute zone running for a graceful shutdown of the components maintained within the hybrid compute zone 622. When the processor 206 encounters the exception, the processor environment agnostic hybrid compute zone exception handling operation prepares the hybrid compute zone 622 by reinitializing the exception handler 620 into a hybrid mode of operation, thus enabling a safe shutdown of the system.

In certain embodiments, the hybrid compute zone operation includes a hybrid compute zone context aware protocol probing operation. As used herein, a hybrid compute zone context aware probing operation broadly refers to a hybrid compute zone operation which probes battery status and processor power consumption information. In certain embodiments, the battery status and processor power consumption information is context aware. As used herein, a battery probe linked system exception context aware protocol broadly refers to a standardized set of rules for formatting and processing data used in the performance of a hybrid compute zone context aware probing operation In certain embodiments, the hybrid compute zone context aware protocol probing operation uses context aware protocol probing of real time battery status and processor power consumption. In certain embodiments, the hybrid compute zone context aware protocol probing operation includes a real time battery probe linked system exception context aware protocol 630 which seamlessly continues processor computation in a hybrid modulated power limit mode of operation. In certain embodiments, the platform power is tuned with respect to current battery power capabilities. In certain embodiments, the battery 660 is tuned to a turbo mode thus preventing pre-mature system shutdown. In certain embodiments, tuning the battery 660 to the turbo mode causes the battery to provide additional power to the hybrid compute zone during the performance of a graceful shutdown.

In certain embodiments, the hybrid compute zone context aware protocol probing operation uses the exception context aware protocol to seamlessly continue processor computation in a hybrid modulated mode of operation while preventing pre-mature system shutdown and completing all pending tasks. In certain embodiments, the hybrid compute zone context aware protocol probing operation is based on a user context. In certain embodiments, the hybrid compute zone context aware protocol probing operation analyzes any pending task stacks or application programming interfaces (APIs) to determine whether a network connection is required to complete a task. If a network connection is required, the hybrid compute zone context aware protocol probing operation ensures that a network port 232 is maintained by the hybrid compute zone 622. In certain embodiments, the hybrid compute zone context aware protocol probing operation determines whether input/output (I/O) operations are necessary to complete any pending task. If I/O operations are required, the hybrid compute zone context aware protocol probing operation ensures that a non-volatile storage such as the system context repository 658, an NVME 222, or a combination thereof, is maintained by the hybrid compute zone 622 to complete the data transactions.

In certain embodiments, the hybrid compute zone context aware protocol probing operation effectively performs a workload context restore by redrawing a system context when the system reboots. In certain embodiments, the workload context restore is effectively performed in real time (e.g., in less than a millisecond). In certain embodiments, the system context is redrawn from a context which is saved during the graceful shutdown.

In certain embodiments, the hybrid compute zone operation includes a hybrid compute zone safe workload execution operation. As used herein, a hybrid compute zone safe workload execution operation broadly refers to a hybrid compute zone operation which identifies, manages, addresses, or a combination thereof non software failures of an information handling system. In certain embodiments, the hybrid compute zone safe workload execution operation enables safe workload execution for non-software failures. In certain embodiments, non-software failures include failures of one or more hardware components of the platform architecture 302. In certain embodiments, the hardware components of the platform architecture 302 includes a processor 206 such as processors included within processor environment 202, an embedded controller 210, an I/O interface 212, such as a USB interface, non-volatile memory such as NVME 222, a graphics interface 244 such as a graphics processing unit, a network interface 232, the battery 660, or a combination thereof.

In certain embodiments, the hybrid compute zone safe workload execution operation performs a workload aware low power checklist-based power operation (e.g., for non-software errors such as hardware or battery issues) which detects and remediates to provide safe workload execution without data corruptions. In certain embodiments, the hybrid compute zone safe workload execution operation has a processor environment agnostic solution focus which efficiently leverages different processor environment architecture methods. For example, the hybrid compute zone safe workload execution operation can execute a processor architecture power manager, a processor architecture power optimizer, or a combination thereof. In certain embodiments, the processor architecture power manager allows reliable and rapid power delivery. In certain embodiments, with the processor architecture power optimizer, the embedded controller 210 is updated with a battery status for the processor to accurately set/regulate a maximum current (ICCMAX) available for the processor 206.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:

providing an information handling system with a distributed BIOS;

identifying a processor environment installed on an information handling system from a plurality of processor environments, the processor environment comprising processor corresponding to a processor architecture; and, performing a hybrid compute zone operation via the distributed BIOS, the hybrid compute zone operation causing a processor of the processor environment to enter into a low power hybrid compute mode of operation, the low power hybrid compute mode of operation controlling a graceful shutdown of the information handling system; and wherein the hybrid compute zone operation is processor environment agnostic.

2. The method of claim 1, wherein:

the plurality of processor environments includes a first processor environment and a second processor environment;

a first processor architecture power manager is used in performance of the hybrid compute zone operation when the processor environment corresponds to the first processor environment; and, a second processor architecture power optimizer is used in performance of the hybrid compute zone operation when the processor environment corresponds to the second processor environment.

3. The method of claim 1, wherein:

the hybrid compute zone operation accesses a processor exception handler, the processor exception handler causing the processor to enter into the low power hybrid compute mode of operation upon detection of a system issue which could result in premature system shutdown.

4. The method of claim 3, wherein:

the processor exception handler interacts with a hybrid compute zone, the hybrid compute zone comprising an operating region of information handling system for initializing, maintaining, and managing items associated with the information handling system during the graceful shutdown.

5. The method of claim 1, wherein:

the hybrid compute zone includes a battery probe linked system exception context aware protocol, the battery probe linked system exception context aware protocol seamlessly continuing processor operation in a hybrid modulated power limit mode of operation.

6. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing an information handling system with a distributed BIOS;

identifying a processor environment installed on an information handling system from a plurality of processor environments, the processor environment comprising processor corresponding to a processor architecture; and, performing a hybrid compute zone operation via the distributed BIOS, the hybrid compute zone operation causing a processor of the processor environment to enter into a low power hybrid compute mode of operation, the low power hybrid compute mode of operation controlling a graceful shutdown of the information handling system; and wherein the hybrid compute zone operation is processor environment agnostic.

7. The system of claim 6, wherein:

the plurality of processor environments includes a first processor environment and a second processor environment;

a first processor architecture power manager is used in performance of the hybrid compute zone operation when the processor environment corresponds to the first processor environment; and, a second processor architecture power optimizer is used in performance of the hybrid compute zone operation when the processor environment corresponds to the second processor environment.

8. The system of claim 7, wherein:

the hybrid compute zone operation accesses a processor exception handler, the processor exception handler causing the processor to enter into the low power hybrid compute mode of operation upon detection of a system issue which could result in premature system shutdown.

9. The system of claim 6, wherein:

the processor exception handler interacts with a hybrid compute zone, the hybrid compute zone comprising an operating region of information handling system for initializing, maintaining, and managing items associated with the information handling system during the graceful shutdown.

10. The system of claim 6, wherein:

the hybrid compute zone includes a battery probe linked system exception context aware protocol, the battery probe linked system exception context aware protocol seamlessly continuing processor operation in a hybrid modulated power limit mode of operation.

11. A non-transitory, computer-readable storage medium embodying computer program code, the computer program code comprising computer executable instructions configured for:

providing an information handling system with a distributed BIOS;

identifying a processor environment installed on an information handling system from a plurality of processor environments, the processor environment comprising processor corresponding to a processor architecture; and, performing a hybrid compute zone operation via the distributed BIOS, the hybrid compute zone operation causing a processor of the processor environment to enter into a low power hybrid compute mode of operation, the low power hybrid compute mode of operation controlling a graceful shutdown of the information handling system; and wherein the hybrid compute zone operation is processor environment agnostic.

12. The non-transitory, computer-readable storage medium of claim 11, wherein:

the plurality of processor environments includes a first processor environment and a second processor environment;

a first processor architecture power manager is used in performance of the hybrid compute zone operation when the processor environment corresponds to the first processor environment; and, a second processor architecture power optimizer is used in performance of the hybrid compute zone operation when the processor environment corresponds to the second processor environment.

13. The non-transitory, computer-readable storage medium of claim 11, wherein:

the hybrid compute zone operation accesses a processor exception handler, the processor exception handler causing the processor to enter into the low power hybrid compute mode of operation upon detection of a system issue which could result in premature system shutdown.

14. The non-transitory, computer-readable storage medium of claim 13, wherein:

the processor exception handler interacts with a hybrid compute zone, the hybrid compute zone comprising an operating region of information handling system for initializing, maintaining, and managing items associated with the information handling system during the graceful shutdown.

15. The non-transitory, computer-readable storage medium of claim 11, wherein:

the hybrid compute zone includes a battery probe linked system exception context aware protocol, the battery probe linked system exception context aware protocol seamlessly continuing processor operation in a hybrid modulated power limit mode of operation.

16. The non-transitory, computer-readable storage medium of claim 11, wherein:

the computer executable instructions are deployable to a client system from a server system at a remote location.

17. The non-transitory, computer-readable storage medium of claim 11, wherein:

the computer executable instructions are provided by a service provider to a user on an on-demand basis.

* * * * *